United States Patent [19]

Atherton et al.

[11] Patent Number: 5,099,490

[45] Date of Patent: Mar. 24, 1992

[54] METHOD FOR REDUCING ENERGY LOSSES IN LASER CRYSTALS

[75] Inventors: L. Jeffrey Atherton, Pleasanton; James J. DeYoreo, Livermore; David H. Roberts, Pleasanton, all of Calif.

[73] Assignee: The United States of America as represented by the United States Department of Energy, Washington, D.C.

[21] Appl. No.: 552,952

[22] Filed: Jul. 16, 1990

[51] Int. Cl.$^5$ .................... H01S 3/17; C09K 11/36
[52] U.S. Cl. ......................... 372/41; 156/DIG. 89; 156/DIG. 73; 252/301.4 F
[58] Field of Search .................. 372/41, 34; 156/DIG. 89, DIG. 73; 252/301.4 F, 301.4 R

[56] References Cited

U.S. PATENT DOCUMENTS 4,587,035  5/1986  Kokta ................... 156/DIG. 73
4,711,696  8/1987  Kokta ................... 156/DIG. 89
4,811,349  3/1989  Payne et al. ................ 372/41

*Primary Examiner*—Frank Gonzalez
*Assistant Examiner*—Susan S. Morse
*Attorney, Agent, or Firm*—Paul R. Martin; Miguel A. Valdes; William R. Moser

[57] ABSTRACT

A process for reducing energy losses in crystals is disclosed which comprises:
  a. heating a crystal to a temperature sufficiently high as to cause dissolution of microscopic inclusions into the crystal, thereby converting said inclusions into point-defects, and
  b. maintaining said crystal at a given temperature for a period of time sufficient to cause said point-defects to diffuse out of said crystal.

Also disclosed are crystals treated by the process, and lasers utilizing the crystals as a source of light.

33 Claims, 4 Drawing Sheets

AS GROWN

1ST ANNEAL (24 hrs AT 800°C)

2ND ANNEAL (24 hrs AT 800°C)

⊢100μm⊣ a-AXIS ← (GROWTH AXIS)

⊙ C-AXIS

METHOD FOR REDUCING ENERGY LOSSES IN LASER CRYSTALS

The U.S. Government has rights to this invention pursuant to Contract No. W-7405-ENG-48 between the U.S. Department of Energy and the University of California, for the operation of Lawrence Livermore National Laboratory.

FIELD OF THE INVENTION

The present invention relates to a method for reducing losses in laser crystals. More particularly, it relates to a method of eliminating the inclusions from laser crystals, thereby reducing scattering losses, and to laser crystals produced by the method. The present invention also relates to tunable solid-state lasers utilizing the laser crystals produced by the method of this invention.

BACKGROUND OF THE INVENTION

A tunable laser is a laser system in which the photonic emission can be varied into different wavelengths. Dye lasers have dominated the tunable laser market for many years. In recent years, however, there has been a resurgence of research and development on tunable solid-state laser materials because of their potential advantages over dye lasers. These advantages include long operating life, a longer energy storage time, reliable and efficient flashlamp pumping, Q-Switching, flexible harmonic generation capability, and improved beam quality at high average power levels. The major commercial products that have appeared so far are alexandrite ($CR^{3+}$:$BeAl_2O_4$), titanium-sapphire ($Ti^{3+}$:$Al_2O_3$, or Ti:Sapphire), and a selection of color center materials that operate at cryogenic temperatures.

In U.S. Pat. No. 4,811,349 two new Cr laser media, Cr:$LiCaAlF_6$ (Cr:LiCAF) and $Cr^{3+}$: $LiSrAlF_6$ (Cr:LiSAF) were disclosed. These media have properties which lead to significantly improved tunable laser performance in the near infrared.

The performance of a solid-state laser material at high pulse energies or high average power is determined by its thermal, thermo-optic, thermo-mechanical, and mechanical properties.

Among the problems encountered in high-power operation are mechanical failure due to thermal stress and degradation of beam quality caused by thermally-induced refractive index changes. Good beam quality at high powers requires materials with low thermally-induced refractive index changes. It also requires the use of crystals which are substantially free of certain types of defects, i.e., scattering centers.

The growth of crystals of adequate size and optical quality is probably the most time consuming and uncertain aspect of developing a new laser crystal. Several techniques are known for growing crystals. Crystals of the type described in U.S. Pat. No. 4,811,349 have been pulled from a melt (the Czochralski, or Cz process), and grown by two variants of the Bridgman process, i.e., gradient freeze (GF) and vertical bridgman (VB). By whatever technique used, the crystals develop micron-size scattering centers, or inclusions, which produce scattering losses of approximately 2%/cm. This is due the presence of roughly 10 parts per million by volume. of sub-micron to micron size defects.

As used herein, the term "energy losses" refers to those losses resulting from light being absorbed within the crystals generating heat, or refracted through the walls after colliding with defects and impurities in the crystals.

Defects in crystals develop during the growth process. The nature of the defects depend upon the physical and mechanical properties of the material, the thermal gradients, the growth temperature, and impurity type and concentration.

A discussion of crystal growth and problems associated therewith is set forth in Crystal Growth, A. W. VERE, Plenum Press 1987.

Defects in crystals have been described in terms of twining, grain boundaries, point-defects, dislocations, inclusions, and impurities.

The defects develop due to a number of reasons, e.g., spurious nucleation, too rapid a solidification rate, local fluctuations in temperature at the growth surface, variations in the impurity concentration and the like.

Among the defects produced during crystal growth are so called lattice point-defects. These point-defects include impurity atoms, and native vacancy and interstitial defects.

According to Vere, as a crystalline material is cooled from high temperature, the equilibrium point-defect concentration characteristic of that temperature must be reduced to that of the end point-temperature. Providing the cooling rate is slow enough, the point-defects can migrate to dislocation, grain boundary or surface sinks. If a high rate of cooling is used, the individual point-defects are quenched or frozen into the lattice, giving a high elastic strain. Cooling at intermediate rates or annealing of fast-cool material causes agglomeration of the defects to form small voids or clusters. These defects can collapse to form planar vacancy or interstitial defects bounded by a dislocation loop. These loops, once formed, act as a sink for further condensation and in some materials can grow to several hundred microns in diameter.

In growth techniques involving confinement of the solidified material in a crucible or similar container, expansion of the solid against the rigid wall or uneven contraction also act as sources of elastic strain. In Czochralski growth, although the material is not under stress from a container, the high thermal gradient of the solidified ingot acts as a source of elastic strain, which is again relieved by dislocation generation.

A further source of dislocation generation in cooling crystals is the presence of inclusions or second-phase precipitates. Such particles act as sources of stress in the elastically-strained matrix and give rise to dislocation generation by prismatic punching.

The final density and distribution of dislocations and precipitates in a particular material depends critically on the formation and migration energy of the point-defects, the cooling rate and the cooling temperature interval and the mechanical properties of the lattice and the external stresses.

It would be desirable in the art to provide a method for reducing the extent of defects in crystals and thereby energy losses in such crystals, in order to improve the ultimate output of lasers utilizing the crystals as a source of the laser beam.

PRIOR ART

Laser crystals in general are described in Crystal Growth, 2nd Ed., Pergamon Press, 1980.

U.S. Pat. No. 4,811,349, describes a chromium doped colquiriite $Cr^{3+}$+$LiCaAlF_6$ laser material and laser. The chromium doped colquiriite laser is tunable over a wide range, 720 nm to 840 nm, and has a slope efficiency comparable to alexandrite.

The inventor is unaware of any prior art disclosing a method for reducing the defects of the chromium doped colquiriite laser crystals and similar products.

SUMMARY OF THE INVENTION

It is an object of this invention to provide a method of reducing the number density of inclusions in crystals.

It is also an object of this invention to provide a method for reducing energy losses in laser crystals.

It is a further object of this invention to provide a laser crystal having reduced passive scattering losses.

It is a still further object of the invention to provide a laser utilizing the laser crystals made by the method of the invention having reduced passive scattering losses.

A method has now been found for reducing the number density of inclusions in laser crystals, and thereby the energy losses. The method is an annealing process which comprises; (a) heating an individual laser crystal to a temperature sufficiently high to cause dissolution of the inclusions in the crystal and simultaneously reducing them to the size of point-defects, and (b) maintaining said crystal at a given temperature for a sufficient period of time to cause diffusion of said point-defects from said crystal.

Another embodiment of the invention is a crystal having reduced passive scattering losses which is produced by the method set forth above.

Still another embodiment of the invention is a laser utilizing the laser crystal produced by the method of the invention.

DETAILED DESCRIPTION OF THE INVENTION

Figure 1B:
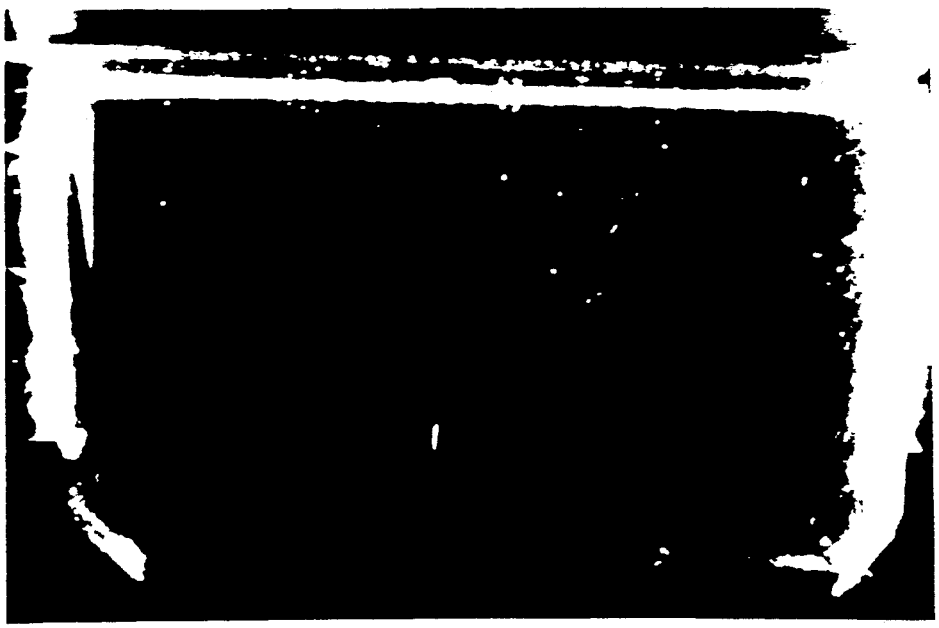
FIG. 1 shows a colquiriite crystal (a) before and (b) after annealing.

The annealing method of this invention is carried out by first heating a crystal boule to a temperature at which the inclusions present therein dissolve in the crystal and are reduced in size to point-defects.

This temperature will vary depending on the particular crystal being treated. When treating the preferred crystals, $Cr:LiCaAlF_6$ (Cr:LiCAF) whose m.p. is 810° C., or $Cr+3:LiSrAlF_6$ (Cr:LiSAF) whose m.p. is 780° C., this temperature can range from about 1 to about 60° C. below the melting point of the crystal, preferably from about 10° to about 20° C.

After the crystal is heated sufficiently to cause the inclusions to dissolve and be reduced in size so that they become point-defects, it is maintained at a given temperature for a sufficient period of time to permit the defects to diffuse from the crystal.

The exact temperature and exact period of time the crystal is treated will vary in accordance with the extent of inclusions, the nature of the crystal, and other considerations such as the minimum dimension of the crystal to be annealed, the maximum acceptable level of losses, and the level of impurities in the annealing atmosphere.

In general, however, when LiCAF is the crystal being used, it will be maintained at a temperature ranging from about 790 to about 810 degrees for about 100 hours for a 4 mm thick crystal. For thicker crystals, the annealing time must be increased by a factor of $D^{2/16}$ where D is the thickness of the crystal in mm.

The ultimate objective, of course, is to reduce the number of inclusions present in the crystal. This, in turn, reduces the level of energy losses when the crystal is used as a laser. In particular, it reduces the passive scattering losses.

As used herein, the terms LiCAF and LiSAF refer to those crystals described in U.S. Pat. No. 4,811,349, the disclosure of which is incorporated herein by reference to the extent allowed by law.

The following procedures were used to make the crystals which were subjected to the annealing treatment described below.

LiCAF crystals were grown by the gradient freeze method using graphite ampoules. In carrying out the gradient freeze process, a temperature gradient was established in a furnace, and a crystal was grown by ramping the furnace temperature (or power) down with time to advance the melt/crystal interface upward. For the examples described below, the temperature gradient was 10° C./cm over the lower 6 centimeters of the ampoule, and the temperature was decreased at 0.8° C. per hour, yielding an average growth rate of 0.8 mm/hour.

The LiCAF growth was seeded with 0.250×1.00 crystals oriented along the a-axis. Five 6 cm long LiCAF crystals were grown by this technique. The starting material for these crystals was previously grown Czochralski (CZ) crystals. The CZ crystals were grown from stoichiometric quantities of LiF, $CaF_2$, and $AlF_3$, doped with 2 mole % $CrF_3$. The mixture was hydrofluorinated with pure HF at 800° C. for four hours prior to growth.

DEFECT MORPHOLOGY

Figure 1A:

Shown in FIG. 1a is a section of pre-treated LiCaF crystal cut perpendicular to the growth direction, or a-axis, and illuminated from the side. Regions of strong scattering are clearly visible and, as shown in Table 1 below, the measured scattering losses for this crystal are about 2-5%/cm.

Figure 2A:
FIGS. 2a, b, and c illustrate three common defect morphologies: (a) curvilinear features (feathers), (b) planar features (nebula), and (c) random defects (smoke).
Figure 2B:
Figure 2C:
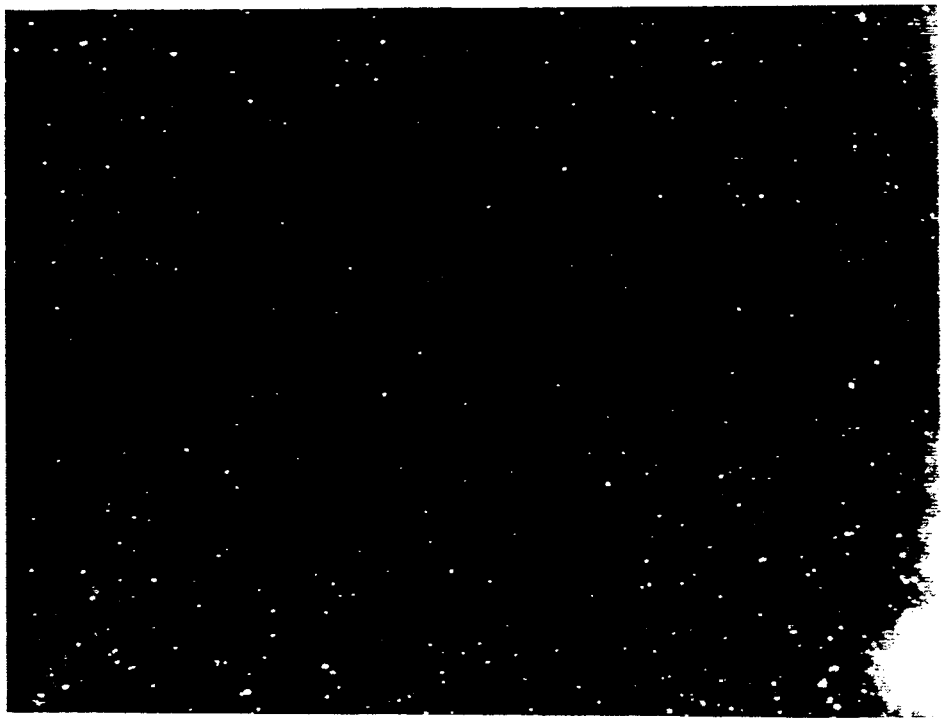

As shown in the optical micrograph in FIG. 2, these regions consist of arrays of discrete, micron to submicron scattering centers. Furthermore, these arrays of defects exhibit three distinct morphologies: curvilinear "feathers," (FIG. 2a); planar "nebulae" (FIG. 2b); and 3-D clouds of randomly distributed defects or "smoke" (FIG. 2c). When a nebula lies within a region of smoke, the nebulae is always surrounded by near defect free material whose boundary follows that of the nebula (See FIG. 2b).

Both the nebula and the feathers lie almost exclusively within the c-plane which is a plane of easy slip in this uniaxial crystal. The feathers are themselves made up of short line segments of defects which almost always lie along one of the a-or a-axis. In contrast, the particles of smoke are randomly distributed. These observations suggest that dislocations associated with shear induced slip in the c-plane provide low energy nucleation sites for the defects, but in the absence of dislocations the defects will nucleate randomly, producing regions of smoke. Finally, as grown crystals of LiCaF always exhibit an approximately 1 mm defect-free region around the perimeter of the crystal.

The process of the invention will be understood more fully by reference to the following examples, which are intended to be illustrative of the invention, but not limiting thereof.

EXAMPLE I

Several boules of LiCAF crystals were prepared by the gradient freeze method described above.

A series of annealing procedures were performed on small crystals of LiCAF from boule X-1000 ($GF_{03189}$). These procedures were carried out in a platinum tube furnace under flowing argon. The crystal samples were approximately $4 \times 10 \times 20$ mm$^3$ and were contained within a graphite crucible open to the argon atmosphere. Annealing times and temperatures ranged from 690° C. to 805C, and one day to fifteen days respectively. The samples were usually cooled at 200° C./hr, however, one sample, X-1000 (3B), was cooled at 3° C./hr.

TABLE I

| Sample I.D. | Annealing History | | Measured Scattering losses (%/cm) Before/After | |
|---|---|---|---|---|
| (X-1000) (1B) | (a) | 1 day @ 750 C., cool @ 200 C./hr | 2–4 | 1–2 |
| | (b) | 15 days @ 785 C., cool @ 200 C./hr | 1–2 | <0.3 |
| | (c) | 4 days @ 796 C., cool @ 3 C./hr | <0.3 | <0.3 |
| (X-1000) (2B) | (a) | 4 days @ 780 C., cool @ 200 C./hr | 2–4 | — |
| (X-1000) (3B) | (a) | 1 day @ 805 C., cool @ 200 C./hr | 2–5 | 2–5 |
| | (b) | 4 days @ 796 C., cool @ 3 C./hr | 2–5 | <0.5 |

As seen from Table 1, for times ≧ greater than 4 days and for temperatures > 750° C., the process of annealing removes the defects and reduces the scattering. This is demonstrated in FIG. 1. The annealed crystals have scattering losses of less than 0.2–0.5% per cm, which represents an order of magnitude reduction in the scattering. No changes in defect concentration or morphology were observed when annealing temperatures were below 750° C.

EXAMPLE II

One set of one day annealing runs was performed on a sample from X-2000 in order to examine the affects of partial annealing on the defect structures. The conditions of the runs were as set forth in Table II.

TABLE II

| Sample I.D. | Annealing History |
|---|---|
| (X-2000) | 1 day @ 790 C., cool @ 200 C./hr |
| | 1 day @ 801 C., cool @ 200 C./hr |

The results are shown in FIG. 3. Referring to FIG. 3, the following observations and conclusions can be made: First, the defect arrays undergo dispersal to more disordered structures with each successive anneal. This indicates that the defects are undergoing dissolution followed by diffusion during annealing, and regrowth during cool-down. Second, the smoke disappears first. This suggests that the dislocations provide low energy nucleation sights, hence the smoke particles are the last to form and the first to disappear. Third, the maximum size of the defects increases from about 1 to 2 micron before annealing to 2–4 microns afterwards. While particle coarsening is thermodynamically favored as a means of reducing the surface free energy, this suggests that the limit on the size of the defects is caused by an increase in strain energy with size. Annealing may relieve the strain and increase the maximum size of the defects.

The cooling rates following the annealing runs (200° C./hr.) were two orders of magnitude larger than those achieved during the crystal growth (1°–3° C./hr.). Consequently, despite the observations described above, the possibility cannot be ruled out that, following dissolution of the defects into the matrix, the samples were being quenched into a metastable state with the defects atomically dispersed.

EXAMPLE III

In order to differentiate between a mechanism of quenching and one of diffusion, the following procedure was carried out.

Two defect-rich crystals, $4 \times 10 \times 20$ mm$^3$ in size, were cut from adjacent positions in boule X-1000. One sample was annealed for four days at 796° C. and then cooled at 200° C./hr., resulting in a defect-free crystal. Both samples were then annealed for four days at 796° C. and then cooled at 3° C./hr. from 796° C. to 580° C. and 20° C./hr. from 580° C. to 20° C. Both crystals were found to be defect-free.

It can be concluded, therefore, that following dissolution, the atomically dispersed defects diffuse out of the sample due to a concentration gradient between the sample and the surrounding atmosphere.

For optimum results to be obtained with this technique on crystals, whose smallest dimension is less than or equal to 2 cm, it has been empirically determined that the diffusion coefficient of the point defects should be no less than about $10^{-8}$ cm$^2$/sec.

On the basis of the foregoing results, it is believed that as the growing LiCAF crystal moves away from the melt/solid interface it reaches a critical temperature, $T_c$, of about 750° C., below which LiCAF becomes supersaturated in either an (extrinsic) impurity species or an excess of an (intrinsic) major constituent. At some temperature below $T_c$, nucleation of the defects occurs both randomly and along dislocations. During annealing, the defects dissolve back into the LiCAF matrix and then diffuse out of the sample along a concentration gradient.

Preferred crystals for use in the method of this invention are those crystals described in U.S. Pat. No. 4,811,349 which is incorporated herein by reference to the extent provided by law. Most preferred is a chromium doped colquiriite having the formula LiCaAlF$_6$:Cr$^{3+}$. When this crystal is used in the method of the invention, it is desirably heated to a temperature ranging from about 790° to 800° C., for a period of time ranging from about 100 to 1500/hrs., depending on the size of the crystal, then cooled.

Related crystals can be fabricated by substituting Ba$^{2+}$, Sr$^{2+}$, Cd$^{2+}$, or Mg$^{2+}$ for Ca$^{2+}$, Sc$^{3+}$ or Ga$^{3+}$ for Al$^{3+}$ and Rb$^+$, K$^+$, or Na$^+$ for Li$^+$. Also, a sensitizer such as Eu$^{2+}$, Pb$^{2+}$, Ce$^{3+}$, Yb$^{2+}$, Cu$^+$ or combinations thereof may be used for providing increased absorption in the UV up to 400 nm, and subsequently transferring the energy to the Cr$^{3+}$ activators. The sensitizer concentration is typically about 0.1–10 mole percent, depending on the particular ion.

While the method of this invention is particularly useful when used in conjunction with the aforementioned colquiriite crystals, it should be realized by those skilled in the art that the same principles will apply to any optical crystal, and which contains substantial amounts of defects, i.e. inclusions, and/or point-defects. The method of this invention is applicable to all such crystals in which the defects are capable of dissolving therein and then are eliminated by diffusion along a concentration gradient.

Figure 4:
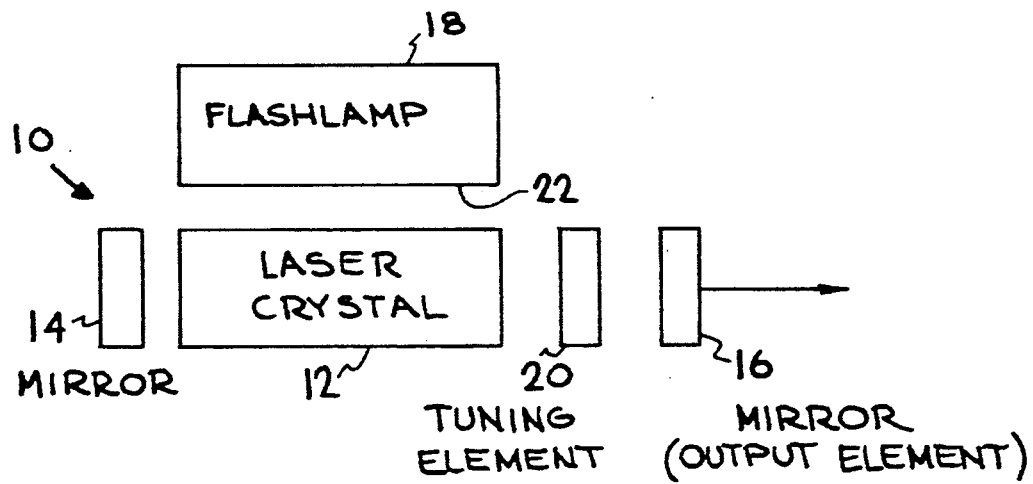
FIG. 4 is a schematic diagram of a laser in accordance with the invention.
Figure 3A:
FIGS. 3(a)-3(f) shows the effect of annealing on defect morphologies.
Figure 3B:
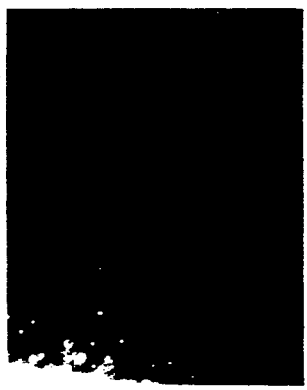
Figure 3C:
Figure 3D:
Figure 3E:
Figure 3F:
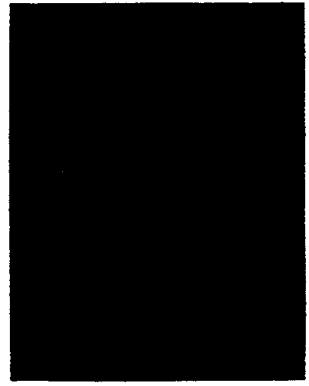

A schematic diagram of a chromium doped colquiriite laser according to the invention is shown in FIG. 4. Laser 10 is formed of a chromium doped colquiriite crystal 12 treated in accordance with the method of the invention placed between a pair of aligned mirrors 14, 16 or other cavity forming means to form a resonator. Excitation means such as flashlamp 18 are placed in proximity to crystal 12 to pump the laser. Mirror 16 is partly transmitting to the laser wavelength to provide the output coupling or energy extraction means while mirror 14 is highly reflecting. A tuning element 20 such as filter may also be placed in the resonant cavity to select or limit the range of laser wavelengths. Since the crystal 12 does not absorb much energy in the band between absorption peaks, flashlamp 18 may be coated with a coating 22 which is reflective at the nonabsorbed wavelengths so that this energy is returned into the flashlamp plasma.

The pumping means for the laser described above is a flashlamp. A diode pumped laser can also be used as will be apparent to those skilled in the art.

The foregoing description of preferred embodiments of the invention have been presented for purposes of illustration and description. It is not intended to be exhaustive or to limit the invention to the precise forms disclosed, and obviously many modifications and variations are possible in light of the above teaching.

The embodiments were chosen and described in order to best explain the principles of the invention and its practical application, to thereby enable others skilled in the art to best utilize the invention and various embodiments and with various modifications, as are suited to the particular use contemplated. It is intended that the scope of the invention be defined by the claims appended hereto.

We claim:

1. A method for reducing scattering losses in Cf:LiCaAlF$_6$ crystals which comprises:
   a. heating said crystal in an inert atmosphere to a temperature in the range of 750° C. to 805° C., and sufficiently high as to cause dissolution of microscopic inclusions into the crystal, thereby converting said inclusions into point-defects,
   b. maintaining said crystal in said temperature range for a period of time sufficient to cause said point-defects to diffuse out of said crystal, and
   c. cooling said crystal in an inert atmosphere.

2. The method of claim 1 wherein said inert atmosphere is argon.

3. The method of claim 1 wherein the point defects in said crystal have a diffusion coefficient of no less than about $10^{-8}$ cm$^2$/sec.

4. The method of claim 1 wherein said crystal is heated to and maintained at a temperature ranging from about 1° to about 60° C. below the melting point thereof.

5. The method of claim 4 wherein said crystal is heated to a temperature of about 790° C., and maintained at that temperature for about 100 hours.

6. The method of claim 5 wherein said crystal is Cr$^{3+}$:LiCaAlF$_6$.

7. The method of claim 1 wherein said crystal is an optical material.

8. The method of claim 7 wherein said crystal is a laser host.

9. The method of claim 8 wherein said crystal is a chromium doped colquiriite.

10. The method of claim 5 wherein said crystal is heated to and maintained at a temperature ranging from about 10° to about 20° C. below the melting point thereof.

11. A Cr:LiCaAlF$_6$ crystal suitable for use as a laser host which has been treated by:
   a. heating said crystal in an inert atmosphere to a temperature in the range of 750° C. to 805° C., and sufficiently high as to cause dissolution of microscopic inclusions into the crystal, thereby converting said inclusions into point-defects,
   b. maintaining said crystal in said temperature range for a period of time sufficient to cause said point-defects to diffuse out of said crystal, and
   c. cooling said crystal in an inert atmosphere.

12. The crystal of claim 11 wherein said crystal is Cr$^+$:LiCaAlF$_6$.

13. The crystal of claim 11 wherein said crystal is chromium doped colquiriite.

14. The crystal of claim 13 wherein said colquiriite is LiCaAlF$_6$.

15. The crystal of claim 14 wherein said colquiriite also contains a Cr$^{3+}$ dopant in the crystal.

16. The crystal of claim 13 wherein said colquiriite crystal is a synthetically grown single crystal.

17. The crystal of claim 11 wherein the point defects in said crystal have a diffusion coefficient of no less than about $10^{-8}$ cm$^2$/sec.

18. The crystal of claim 12 wherein said crystal is heated to and maintained at a temperature ranging from about 1° C. to about 60° C. below the melting point thereof.

19. The crystal of claim 18 wherein said crystal is heated to a temperature of about 790° C., and maintained at that temperature for about 100 hours.

20. The crystal of claim 11 wherein said crystal is a laser host.

21. The crystal of claim 11 wherein said crystal is chromium doped colquiriite.

22. The crystal of claim 21 wherein said colquiriite is LiCaAlF$_6$.

23. The crystal of claim 21 wherein said colquiriite also contains a Cr$^{3+}$ dopant in the crystal.

24. The crystal of claim 23 wherein said colquiriite crystal is a synthetically grown single crystal.

25. An improved chromium solid state laser, comprising:
   a chromium doped fluoride laser crystal of the composition Cr$^{3+}$:XYZF$_6$ wherein X is selected from Li$^+$, Na$^+$, K$^+$, and Rb$^+$, Y is selected from CA$^{2+}$, Sr$^{2+}$, Ba$^{2+}$, Cd$^{2+}$, and Mg$^{2+}$, and Z is selected from Al$^{3+}$, Ga$^{3+}$, and Sc$^{3+}$, wherein said crystal has been treated by heating it to a temperature ranging from about 1° C. to about 60° C. below the melting point thereof, and sufficient to cause dissolution of microscopic inclusions into the crystal, thereby converting said inclusions into point defects, and maintained at that temperature for a period of time sufficient to cause the point defects therein to diffuse out of said crystal;

excitation means associated with the crystal for pumping the crystal;

cavity forming means surrounding the crystal to form a resonant laser cavity;

energy extraction means associated with the cavity forming means to remove laser energy from the cavity.

26. The laser of claim 25 wherein the crystal is a chromium doped colquiriite laser crystal ($Cr^{3+}$:$LiCaAlF_6$).

27. The laser of claim 26 having a slope efficiency of about 60%.

28. The laser of claim 26 which is tunable over the range of at least 720 nm to 840 nm.

29. The laser of claim 25 wherein the excitation means is a flashlamp.

30. The laser of claim 29 wherein the flashlamp includes a coating reflective at wavelengths not strongly absorbed by the crystal.

31. The laser of claim 25 further comprising a tuning means placed in the cavity.

32. The laser of claim 25 further comprising a sensitizer in the crystal.

33. An improved crystal suitable for use in a laser having scattering losses no greater than about 0.5%/cm of length.

* * * * *